(12) United States Patent
Sako et al.

(10) Patent No.: US 9,230,248 B2
(45) Date of Patent: Jan. 5, 2016

(54) PHYSICAL-QUANTITY RECEIVING DEVICE AND PHYSICAL-QUANTITY SUPPLYING DEVICE WITH PAYMENT RECEIVING FEATURE

(71) Applicant: Sony Corporation, Tokyo (JP)

(72) Inventors: Yoichiro Sako, Tokyo (JP); Takanori Washiro, Kanagawa (JP); Kazutoshi Serita, Tokyo (JP)

(73) Assignee: SONY CORPORATION, Tokyo (JP)

( * ) Notice: Subject to any disclaimer, the term of this patent is extended or adjusted under 35 U.S.C. 154(b) by 1 day.

(21) Appl. No.: 13/945,533

(22) Filed: Jul. 18, 2013

(65) Prior Publication Data

US 2014/0040124 A1 Feb. 6, 2014

(30) Foreign Application Priority Data

Jul. 31, 2012 (JP) ................................. 2012-169605

(51) Int. Cl.
*G06Q 50/06* (2012.01)
*G06Q 30/04* (2012.01)
*G06Q 20/14* (2012.01)
*G07F 13/02* (2006.01)
*G07F 15/00* (2006.01)

(52) U.S. Cl.
CPC ............ *G06Q 20/145* (2013.01); *G07F 13/025* (2013.01); *G07F 15/00* (2013.01)

(58) Field of Classification Search
CPC ....... G06Q 30/00; G06Q 50/00; G06Q 50/06; G06Q 30/04; G01R 20/00

USPC .................. 705/39, 412, 400, 63, 40
See application file for complete search history.

(56) References Cited

U.S. PATENT DOCUMENTS

| | | | |
|---|---|---|---|
| 7,502,698 B2* | 3/2009 | Uenou et al. ................... 702/60 |
| 2010/0145540 A1* | 6/2010 | McKenna ..................... 700/295 |
| 2010/0145885 A1* | 6/2010 | Graziano et al. .............. 705/412 |
| 2012/0116575 A1* | 5/2012 | Prosser et al. ................ 700/232 |
| 2013/0254097 A1* | 9/2013 | Marathe et al. ................ 705/39 |

FOREIGN PATENT DOCUMENTS

| | | |
|---|---|---|
| JP | 2006-031182 | 2/2006 |
| JP | 2009-098928 | 5/2009 |

\* cited by examiner

*Primary Examiner* — Jagdish Patel
(74) *Attorney, Agent, or Firm* — Hazuki International, LLC

(57) ABSTRACT

A physical-quantity receiving device includes: a receiving section that receives a predetermined physical quantity from a physical-quantity supplying device; a notification section that provides a user with a notification that the user is under obligation to make payment for the received physical quantity; an input section that receives a user's input that indicates whether to receive the physical quantity; a display section that displays the notification from the notification section and the user's input to the input section; and a payment section that makes payment for the physical quantity per a unit time by electronic money after a lapse of the unit time, or makes payment for a unit physical quantity by electronic money after receipt of the unit physical quantity.

14 Claims, 3 Drawing Sheets

PHYSICAL-QUANTITY RECEIVING DEVICE AND PHYSICAL-QUANTITY SUPPLYING DEVICE WITH PAYMENT RECEIVING FEATURE

CROSS REFERENCES TO RELATED APPLICATIONS

The present application claims priority to Japanese Priority Patent Application JP 2012-169605 filed in the Japan Patent Office on Jul. 31, 2012, the entire content of which is hereby incorporated by reference.

BACKGROUND

The disclosure relates to a physical-quantity receiving device, a physical-quantity supplying device, a physical-quantity receiving method, a physical-quantity supplying method, a storage medium having a physical-quantity receiving program, and a storage medium having a physical-quantity supplying program.

An information processing system, an information processing device, an information processing method, and an information recording medium, which are controlled to produce operation sound effects varying among card users when performing operation for electronic money, are disclosed in, for example, Japanese Unexamined Patent Application Publication No. 2006-031182. In addition, an electronic money system, an information processing device, an information processing method, and a program, which allow recognition of the time to charge electronic money, are disclosed in, for example, Japanese Unexamined Patent Application Publication No. 2009-098928.

SUMMARY

Meanwhile, electronic money payment in a vending machine is usually prepayment based on one-time billing. Therefore, a user of electronic money is allowed to know a billing state easily and reliably. However, for example, in a state in which a physical quantity such as electric power is continuously supplied or received, specifically, in a state in which an electric apparatus or the like is in action by being connected to an outlet or the like, continuous billing for a user or the like of the electric apparatus or the like occurs, but this user may not be aware of this billing state reliably and precisely.

It is desirable to provide a physical-quantity receiving device, a physical-quantity supplying device, a physical-quantity receiving method, a physical-quantity supplying method, a storage medium having a physical-quantity receiving program, and a storage medium having a physical-quantity supplying program, which allow a user or the like of the physical-quantity receiving device to recognize occurrence of continuous billing reliably in a state in which a predetermined physical quantity is supplied or received.

According to an embodiment of the disclosure, there is provided a physical-quantity receiving device including an accounting unit including: a receiving section receiving a predetermined physical quantity from a physical-quantity supplying device, the physical quantity allowing the physical-quantity receiving device to be driven; a notification section providing, during receipt of the physical quantity, a user with a notification that the user is under obligation to make payment for the received physical quantity, and providing the user with an inquiry about whether to continue receiving the physical quantity; an input section receiving a user's input that indicates whether to receive the physical quantity, and whether to continue receiving the physical quantity; a display section displaying the notification from the notification section and the user's input to the input section; and a payment section making payment for the physical quantity per a unit time by electronic money after a lapse of the unit time, or making payment for a unit physical quantity by electronic money after receipt of the unit physical quantity.

According to an embodiment of the disclosure, there is provided a physical-quantity supplying device including an accounting unit including: a supply section supplying a predetermined physical quantity to a physical-quantity receiving device, the physical quantity allowing the physical-quantity receiving device to be driven; a notification section providing, during supply of the physical quantity, a user with a notification that the user is under obligation to make payment for the received physical quantity, and providing the user with an inquiry about whether to continue supplying the physical quantity; and a settlement section requesting the physical-quantity receiving device to make payment for the physical quantity per a unit time by electronic money after a lapse of the unit time, or requesting the physical-quantity receiving device to make payment for a unit physical quantity by electronic money after supply of the unit physical quantity.

According to an embodiment of the disclosure, there is provided a physical-quantity receiving method of receiving a predetermined physical quantity. The method includes: providing, during receipt of the physical quantity, a user with a notification that the user is under obligation to make payment for the received physical quantity, and providing the user with an inquiry about whether to continue receiving the physical quantity; and making payment for the physical quantity per a unit time by electronic money after a lapse of the unit time, or making payment for a unit physical quantity by electronic money after receipt of the unit physical quantity, when continuing receipt of the physical quantity.

According to an embodiment of the disclosure, there is provided a physical-quantity supplying method of supplying a predetermined physical quantity. The method includes: providing, during supply of the physical quantity, a user with a notification that the user is under obligation to make payment for the received physical quantity, and providing the user with an inquiry about whether to continue supplying the physical quantity; and making a request for making payment for the physical quantity per a unit time by electronic money after a lapse of the unit time, or making a request for making payment for a unit physical quantity by electronic money after supply of the unit physical quantity, when continuing supply of the physical quantity.

According to an embodiment of the disclosure, there is provided a non-transitory storage medium having a machine-readable physical-quantity receiving program embodied therein. The physical-quantity receiving program allows, when executed by a physical-quantity receiving device, an accounting unit of the physical-quantity receiving device to implement a method. The physical-quantity receiving device receives a predetermined physical quantity from a physical-quantity supplying device and is driven by the physical quantity. The method includes: providing, during receipt of the physical quantity, a user with a notification that the user is under obligation to make payment for the received physical quantity, and providing the user with an inquiry about whether to continue receiving the physical quantity; and making payment for the physical quantity per a unit time by electronic money after a lapse of the unit time, or making payment for a unit physical quantity by electronic money after receipt of the unit physical quantity, when continuing receipt of the physical quantity.

According to an embodiment of the disclosure, there is provided a non-transitory storage medium having a machine-readable physical-quantity supplying program embodied therein. The physical-quantity supplying program allows, when executed by a physical-quantity supplying device, an accounting unit of the physical-quantity supplying device to implement a method. The physical-quantity supplying device supplies a predetermined physical quantity to a physical-quantity receiving device to allow the physical-quantity receiving device to be driven. The method includes: providing, during supply of the physical quantity, a user with a notification that the user is under obligation to make payment for the received physical quantity, and providing the user with an inquiry about whether to continue supplying the physical quantity; and making a request for making payment for the physical quantity per a unit time by electronic money after a lapse of the unit time, or making a request for making payment for a unit physical quantity by electronic money after supply of the unit physical quantity, when continuing supply of the physical quantity.

In the physical-quantity receiving device according to the above embodiment of the disclosure, there is provided the payment section that makes payment for the physical quantity per a unit time by electronic money after a lapse of the unit time, or makes payment for a unit physical quantity by electronic money after receipt of the unit physical quantity. There is further provided the notification section that provides, during receipt of the physical quantity, a user with a notification that the user is under obligation to make payment for the received physical quantity, and provides the user with an inquiry about whether to continue receiving the physical quantity. Further, in the physical-quantity receiving method according to the above embodiment of the disclosure or the storage medium having the physical-quantity receiving program according to the above embodiment of the disclosure, payment is made for the physical quantity per a unit time by electronic money after a lapse of the unit time, or payment is made for a unit physical quantity by electronic money after receipt of the unit physical quantity, when continuing receipt of the physical quantity. Here, during receipt of the physical quantity, a notification is provided to a user that the user is under obligation to make payment for the received physical quantity, and an inquiry is provided to the user about whether to continue receiving the physical quantity. Therefore, in a state of receiving a predetermined physical quantity continuously, the user or the like of the physical-quantity receiving device is allowed to grasp occurrence of continuous billing reliably.

In the physical-quantity supplying device according to the above embodiment of the disclosure, there is provided the settlement section that requests the physical-quantity receiving device to make payment for the physical quantity per a unit time by electronic money after a lapse of the unit time, or requests the physical-quantity receiving device to make payment for a unit physical quantity by electronic money after supply of the unit physical quantity. There is further provided the notification section that provides, during supply of the physical quantity, a user with a notification that the user is under obligation to make payment for the received physical quantity, and provides the user with an inquiry about whether to continue supplying the physical quantity. Further, in the physical-quantity supplying method according to the above embodiment of the disclosure or the storage medium having the physical-quantity supplying program according to the above embodiment of the disclosure, a request is made for making payment for the physical quantity per a unit time by electronic money after a lapse of the unit time, or a request is made for making payment for a unit physical quantity by electronic money after supply of the unit physical quantity, when continuing supply of the physical quantity. Here, during supply of the physical quantity, a notification is provided to a user that the user is under obligation to make payment for the received physical quantity, and an inquiry is provided to the user about whether to continue supplying the physical quantity. Therefore, in a state of supplying a predetermined physical quantity continuously, the user or the like of the physical-quantity supplying device is allowed to grasp occurrence of continuous billing reliably.

It is to be understood that both the foregoing general description and the following detailed description are exemplary, and are intended to provide further explanation of the application as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to describe the principles of the application.

DETAILED DESCRIPTION

Figure 1:
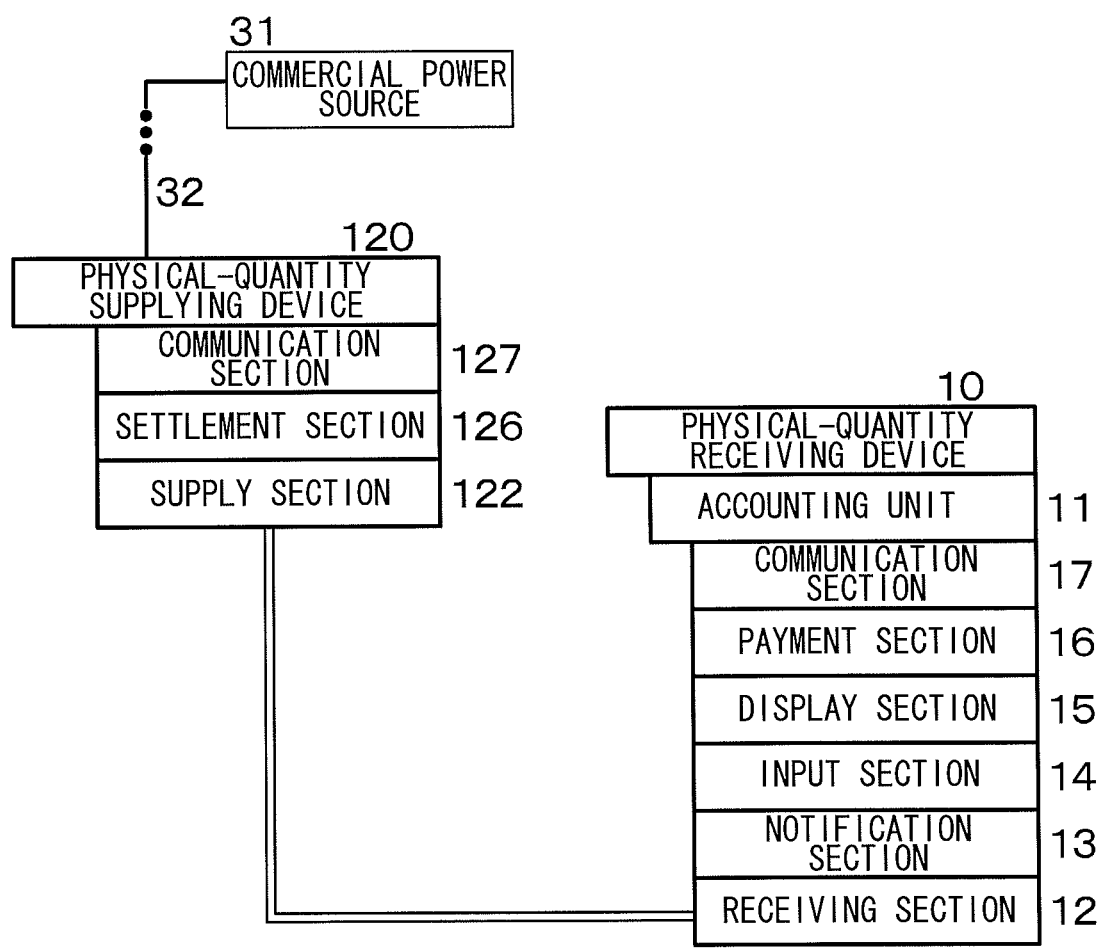
FIG. 1 is a conceptual diagram of a physical-quantity receiving device according to a first embodiment.

The disclosure will be described based on some embodiments, with reference to the drawings. The disclosure is not limited to the following embodiments, and various numerical values and materials in the embodiments are illustrative. It is to be noted that the description will be provided in the following order.

1. Description about a physical-quantity receiving device, a physical-quantity supplying device, a physical-quantity receiving method, a physical-quantity supplying method, a physical-quantity receiving program, and a physical-quantity supplying program, as a whole, according to example embodiments of the disclosure
2. First Embodiment (a physical-quantity receiving device, a physical-quantity receiving method, and a physical-quantity receiving program according to example embodiments the disclosure)
3. Second Embodiment (a modification of the first embodiment)
4. Third Embodiment (a physical-quantity supplying device, a physical-quantity supplying method, and a physical-quantity supplying program according to example embodiments of the disclosure)
5. Fourth Embodiment (a modification of the third embodiment)
6. Fifth Embodiment (a modification of any of the third embodiment and the fourth embodiment) and others

[Description about Physical-Quantity Receiving Device, Physical-Quantity Supplying Device, Physical-Quantity Receiving Method, Physical-Quantity Supplying Method, Physical-Quantity Receiving Program, and Physical-Quantity Supplying Program as a Whole According to Example Embodiments of the Disclosure]

In the following description, a physical-quantity receiving device, a physical-quantity supplying device, a physical-quantity receiving method, a physical-quantity supplying method, a physical-quantity receiving program, and a physical-quantity supplying program according to example embodiments of the disclosure may be collectively referred to simply as "embodiments of the disclosure".

The physical-quantity supplying device according to any of embodiments of the disclosure may take a form of further including an input section inputting (receiving a user's input) whether to accept supply of a physical quantity and whether to continue supplying the physical quantity. In this case, a form of further including a display section displaying contents of notification of a notification section and contents of input in the input section may be taken. Alternatively, the physical-quantity supplying device according to any of embodiments of the disclosure may take a form of further including a communication section. This communication section sends contents of notification of a notification section to a physical-quantity receiving device, and receives contents of input in the physical-quantity receiving device about whether to accept supply of a physical quantity and whether to continue supplying the physical quantity. It is to be noted that, in this case, the physical-quantity receiving device may preferably include an input section inputting (receives a user's input) whether to accept supply of the physical quantity and whether to continue supplying the physical quantity, and a display section displaying contents of notification of the notification section and contents of input in the input section.

In the physical-quantity receiving device, the physical-quantity receiving method, the physical-quantity supplying method, the physical-quantity receiving program, or the physical-quantity supplying program according to any of embodiments of the disclosure, or in the physical-quantity supplying device according to any of embodiments of the disclosure in any of the above-described various forms, the physical quantity may be electric power. However, the physical quantity is not limited thereto, and may be any other type such as gases including city gas and liquids including water.

In the physical-quantity receiving device according to any of embodiments of the disclosure including the above-described preferable configuration, the physical-quantity supplying device including a supply section to be engaged with a receiving section may be configured as a device exclusive to the physical-quantity receiving device. In addition, the physical-quantity supplying device according to any of embodiments of the disclosure including the above-described preferable forms and configuration may be configured as a device exclusive to the physical-quantity receiving device including a receiving section to be engaged with a supply section.

Further, in the physical-quantity receiving device according to any of embodiments of the disclosure including the above-described preferable configurations may be configured such that, the physical quantity is electric power, the physical-quantity receiving device further includes a power-line transmit-receive section and a communication filter, the communication filter is disposed between the receiving section and the power-line transmit-receive section, and blocks at least a signal at having a frequency of the electric power, without blocking a first high frequency signal and a second high frequency signal, the power-line transmit-receive section receives the first high frequency signal having a frequency higher than the frequency of the electric power from the physical-quantity supplying device, via the communication filter and the supply section, the power-line transmit-receive section generates the electric power based on the first high frequency signal, and generates the second high frequency signal serving as identification information by load modulation, and the power-line transmit-receive section sends the second high frequency signal to the physical-quantity supplying device, via the communication filter and the receiving section. This makes it possible to recognize the physical-quantity receiving device, even when the electric power that is the physical quantity is not supplied.

Furthermore, the physical-quantity supplying device according to any of embodiments of the disclosure including the above-described preferable forms and configuration may be configured such that, the physical quantity is electric power, the physical-quantity supplying device further includes a power-line transmit-receive section and a communication filter, the communication filter is disposed between the supply section and the power-line transmit-receive section, and blocks at least a signal having a frequency of the electric power, without blocking a first high frequency signal and a second high frequency signal, the power-line transmit-receive section sends the first high frequency signal having a frequency higher than the frequency of the electric power to the physical-quantity supplying device, via the communication filter and the supply section, and the power-line transmit-receive section receives, via the supply section and the communication filter, the second high frequency signal generated as identification information by load modulation, based on the electric power that is generated based on the first high frequency signal, in the physical-quantity receiving device. This makes it possible to recognize the physical-quantity receiving device, even when the electric power that is the physical quantity is not supplied to the physical-quantity receiving device.

Still furthermore, in any of embodiments of the disclosure including the above-described preferable forms and configurations, the physical quantity may be configured using a packet structure including a header section and a payload, and the header section may include information about the physical-quantity receiving device. Further, there may be adopted a configuration in which it is determined whether to allow receipt of the physical quantity, based on the information about the physical-quantity receiving device included in the header section (the physical-quantity receiving device, the physical-quantity receiving method, and the physical-quantity receiving program according to example embodiments of the disclosure). Alternatively, there may be adopted a configuration in which the header section including the information about the physical-quantity receiving device and the payload are sent to the physical-quantity receiving device (the physical-quantity supplying device, the physical-quantity supplying method, and the physical-quantity supplying program according to example embodiments of the disclosure). In this case, there may be adopted a configuration of receiving, from the physical-quantity receiving device, determination as to whether to allow supply of the physical quantity to the physical-quantity receiving device based on the information about the physical-quantity receiving device included in the header section, and supplying the physical quantity when the supply of the physical quantity is allowed in the determination. It is to be noted that, preferably, the physical-quantity receiving device according to any of embodiments of the disclosure may include a packet disassembly section. Preferably, the physical-quantity supplying device according to any of embodiments of the disclosure may include a packet generation section, and the information about the physical-quantity receiving device may be included in the header section in the packet structure sent from outside.

Here, other than the information about the physical-quantity receiving device, specific examples of the information included in the header section may include the following.
(A) Information indicating whether or not power is renewable energy, or information identifying electric power based on various power production sources (specifically, for example, a code or an ID about information on an electric-power production source or the type of electric power, to be more specific, information about the type of electric power, e.g.: thermal power generation using oil or coal; power generation based on natural gas; nuclear power generation; hydraulic power generation; and green energy or renewable energy using power of nature including solar power generation, solar thermal power generation, wind power generation, geothermal power generation, biomass generation, tidal power generation, and ocean thermal energy conversion)
(B) Information about the amount of power supply (a magnitude of supplied electric power)
(C) Amount of electric power that is a payload length of the payload
(D) Flag discriminating between AC and DC
(E) Voltage level
(F) Country or local code or ID
(G) Code or ID of electric power generation, manufacturing, or power distribution company
(H) Flag discriminating between commercial use and private use
(I) Electric-power transmission source address
(J) Electric-power transmission source identification information
(K) Electric-power transmission destination address
(L) Electric power transmission destination identification information
(M) Next header tag
(N) Unit price
(O) Carbon dioxide emission per electric-power generation unit time
(P) Channel information on power transmission and distribution In addition, electric power may be used as the payload.

Moreover, in any of embodiments of the disclosure including the above-described preferable forms and configurations, the physical-quantity receiving device receiving a predetermined physical quantity may be a cellular phone, a smartphone, a car navigation device, a tablet terminal, a personal digital assistant, a mobile music player, a mobile video player, a mobile game console, a personal computer, or an electric car, but is not limited thereto.

In the physical-quantity receiving device according to any of embodiments of the disclosure, the receiving section of an accounting unit may be exemplified by an attachment plug. In the physical-quantity supplying device according to any of embodiments of the disclosure, the supply section of an accounting unit may be exemplified by a receptacle. It is to be noted that when wiring attachment equipment is configured using the receiving section and the supply section, it is possible to perform electrical connection and disconnection between the physical-quantity receiving device and the physical-quantity supplying device, by insertion and removal of the attachment plug into and from the receptacle. Specific examples of a form of the receptacle may include an outlet, a cord connector body, and a multitap. Alternatively, examples of a combination of the receiving section and the supply section may include a so-called cradle.

In the physical-quantity receiving device, the notification section and a payment section may be configured of, for example, a combination of a CPU and a storage section (memory, storage medium, or the like). The notification section and the payment section may be configured using separate circuits, or may be configured of an integral circuit. The display section may be exemplified by a liquid crystal display or an organic electroluminescence display (an organic EL display), and the input section may be exemplified by a keyboard or a touch panel integral with the display section. When the physical-quantity receiving device is assumed to be a cellular phone, a smartphone, a car navigation device, a tablet terminal, a personal digital assistant, a mobile music player, a mobile video player, a mobile game console, a personal computer, or an electric car, a display provided in any of these may be used as the display section, and an input device provided in any of these may be used as the input section. It is desirable that the physical-quantity receiving device be connected to the Internet, in view of making payment (or payment of a value) by electronic money, as well as acquisition or exchange of various kinds of data.

Further, in the physical-quantity supplying device, the notification section and a settlement section may be configured of a combination of a CPU and a storage section (memory, storage medium, or the like), for example. The notification section and the settlement section may be configured using separate circuits, or may be configured of an integral circuit. The display section may be exemplified by a liquid crystal display or an organic EL display, and the input section may be exemplified by a keyboard or a touch panel integral with the display section. It is desirable that the physical-quantity supplying device be connected to the Internet, in view of payment of a value by electronic money, as well as acquisition or exchange of various kinds of data. Further, the communication section may be configured of an existing communication device, and not only radio, cable, communication line, public line, infrared rays, and the like, but also a Power Line Communication (PLC) technique may be used as a communication method.

In the physical-quantity receiving device according to any of embodiments of the disclosure, during receipt of the physical quantity, the notification section of the accounting unit notifies the user that an obligation to pay a value is effected. Specifically, the notification section may not only cause the display section to display contents of notification, but may also notify the user by sound, music, light (color), blinking of light, and/or vibration. Similarly, in the physical-quantity supplying device according to any of embodiments of the disclosure, during supply of the physical quantity, the notification section of the accounting unit notifies the user that an obligation to pay a value is effected. Specifically, the notification section may not only cause the display section to display contents of notification, but may also notify the user by sound, music, light (color), blinking of light, and/or vibration. Alternatively, the notification section may notify a cellular phone, a smartphone, and/or the like owned by the user that an obligation to pay a value is effected.

[First Embodiment]

A first embodiment is about a physical-quantity receiving device and a physical-quantity receiving method according to an embodiment of the disclosure. As illustrated in a conceptual diagram of FIG. 1, a physical-quantity receiving device 10 of the first embodiment includes an accounting unit 11. The physical-quantity receiving device 10 receives a predetermined physical quantity (specifically, electric power) from a physical-quantity supplying device 120, and is capable of being driven by the physical quantity. The accounting unit 11 includes, (A) a receiving section 12 that receives a physical quantity,
(B) a notification section 13 that notifies a user that an obligation to pay a value is effected, and asks the user whether to continue receiving a physical quantity, during receipt of the physical quantity,
(C) an input section 14 that inputs whether to accept receipt of a physical quantity and whether to continue receiving the physical quantity,
(D) a display section 15 that displays contents of notification of the notification section 13 and contents of input in the input section 14, and
(E) a payment section 16 that pays, after a lapse of a unit time, or after receipt of a unit physical quantity, a value of the physical quantity per the unit time or a value for the unit physical quantity, by electronic money.

In the physical-quantity receiving device 10 of the first embodiment, the physical-quantity supplying device 120 including a supply section 122 to be engaged with the receiving section 12 is a device exclusive to the physical-quantity receiving device 10. To the physical-quantity supplying device 120, a physical quantity (electric power) is supplied from a commercial power source 31 via a distribution line 32.

In the first embodiment or any of a second embodiment to a fifth embodiment described later, the physical-quantity receiving device 10 (110) is assumed to be a personal computer. Further, the display section 15 (115) is configured using a liquid crystal display provided in the personal computer, and the input section 14 (114) is configured using a keyboard provided in the personal computer. In the first embodiment or any of the second embodiment to the fifth embodiment described later, the physical-quantity receiving device 10 (110) and the physical-quantity supplying device 120 (20) are connected to the Internet via communication sections 17 (117) and 127 (27), respectively. The communication sections 17 (117) and 127 (27) are each configured using an existing communication device.

Furthermore, in the physical-quantity receiving device 10 (110) of the first embodiment or any of the second embodiment to the fifth embodiment described later, the notification section 13 and the payment section 16 (116) may be configured using, for example, a combination of a CPU and a storage section (memory, storage medium, or the like). In addition, the notification section 13 and the payment section 16 (116) are configured using an integral circuit. Here, to be more specific, the notification section 13 and the payment section 16 (116) are embodied by a personal computer.

In the physical-quantity receiving device 10 (110) of the first embodiment or any of the second embodiment to the fifth embodiment described later, the receiving section (a power receiving section) 12 (112) is configured using an attachment plug. On the other hand, in the first embodiment or any of the second embodiment to the fifth embodiment described later, a supply section (a power supply section) 22 (122) in the physical-quantity supplying device 20 (120) is configured using a receptacle, more specifically, an outlet. It is possible to perform electrical connection and disconnection between the physical-quantity receiving device 10 (110) and the physical-quantity supplying device 20 (120) easily, by inserting and extracting the attachment plug in and from the receptacle. In proximity to the supply section 22 (122) of the physical-quantity supplying device 20 (120), a fact that supply (feeding) of a physical quantity (electric power) from the physical-quantity supplying device 20 (120) is available at cost is displayed, so that a user of the physical-quantity receiving device 10 (110) clearly understands that the supply (feeding) of the physical quantity (the electric power) from the physical-quantity supplying device 20 (120) is available on a chargeable basis.

A physical-quantity receiving method of the first embodiment is a method of receiving a predetermined physical quantity. Further, a physical-quantity receiving program of the first embodiment is a program provided to perform processing in the accounting unit 11, in the physical-quantity receiving device 10 that includes the accounting unit 11, receives a predetermined physical quantity from the physical-quantity supplying device 120, and is capable of being driven by the physical quantity. Further, in the physical-quantity receiving method or the physical-quantity receiving program of the first embodiment, a user is notified that an obligation to pay a value is effected, and the user is asked whether to continue receiving a physical quantity, during receipt of the physical quantity, and after a lapse of a unit time, or after receipt of a unit physical quantity, a value of the physical quantity per the unit time or a value for the unit physical quantity is paid by electronic money.

Specifically, the receiving section (the attachment plug) 12 in the physical-quantity receiving device 10 is inserted into the supply section (the receptacle) 122 in the physical-quantity supplying device 120. Subsequently, the personal computer forming the physical-quantity receiving device 10 is activated, and further, the physical-quantity receiving program is started up. On the display section 15 of the accounting unit 11 in the physical-quantity receiving device 10, whether to accept receipt of the physical quantity is displayed. When start of receiving the physical quantity from the input section 14 is ordered by the user of the physical-quantity receiving device 10, supply of the physical quantity (the electric power) from the physical-quantity supplying device 120 via the supply section (the power supply section) 122 and the receiving section (the power receiving section) 12 is initiated. Specifically, charging of a battery in the personal computer forming the physical-quantity receiving device 10 is started.

During receipt of the physical quantity, the notification section 13 notifies the user that an obligation to pay a value is effected. Specifically, a sound effect of "a beep" may be produced, for example, per unit time, specifically, per minute, by a speaker built in the personal computer forming the physical-quantity receiving device 10, for example. In addition, the fact that the obligation to pay the value is effected is displayed on the display section 15, and the amount of the value (an amount of money) is displayed. Further, during receipt of the physical quantity, the notification section 13 keeps asking the user by using the display section 15, about whether to continue receiving the physical quantity.

Unless input ordering to stop receipt of the physical quantity is provided from the input section 14, the supply of the physical quantity continues. Subsequently, after a lapse of a unit time (for example, after a lapse of one minute) or after receiving a unit physical quantity (e.g. 10 watts), the payment section 16 performs payment of a value of the physical quantity per the unit time or a value for the unit physical quantity, based on an existing method. Specifically, for a settlement section 126 included in the physical-quantity supplying device 120, payment by electronic money is performed via the communication sections 17 and 127 as well as a communication line (not illustrated). Alternatively, for a server (not illustrated) managing the physical-quantity supplying device 120, payment by electronic money is performed via the communication sections 17 and 127 as well as a communication line (not illustrated). It is to be noted that the settlement section 126 in the physical-quantity supplying device 120 may be configured using, for example, a combination of a CPU and a storage section (memory, storage medium, or the like), i.e. using an integral circuit.

When input ordering to stop receipt of the physical quantity is performed in the input section 14, the payment section 16 stops the receipt of the physical quantity after a lapse of the unit time, or after receipt of the unit physical quantity. The payment section 16 then pays the value of the physical quantity per the unit time or the value for the unit physical quantity, by electronic money. Alternatively, also when the battery in the personal computer forming the physical-quantity receiving device 10 is fully charged, the payment section 16 stops receipt of the physical quantity after a lapse of the unit time, or after receipt of the unit physical quantity. The payment section 16 then pays a value of the physical quantity per the unit time or a value for the unit physical quantity, by electronic money.

The physical-quantity receiving device of the first embodiment includes the payment section that pays, after a lapse of the unit time, or after receipt of the unit physical quantity, the value of the physical quantity per the unit time or the value for the unit physical quantity, by electronic money. The physical-quantity receiving device of the first embodiment further includes the notification section that notifies, during receipt of the physical quantity, the user that the obligation to pay the value is effected, and asks the user whether to continue receiving the physical quantity. In addition, in the physical-quantity receiving method or the physical-quantity receiving program of the first embodiment, in a case in which receipt of the physical quantity is to be continued, after a lapse of the unit time or after receipt of the unit physical quantity, the value of the physical quantity per the unit time or the value for the unit physical quantity is paid by electronic money. Here, during receipt of the physical quantity, the user is notified that the obligation to pay the value is effected, and the user is asked whether to continue receiving the physical quantity. Therefore, in a state of receiving a predetermined physical quantity continuously, the user or the like of the physical-quantity receiving device is allowed to reliably and precisely grasp occurrence of continuous billing. The user of the physical-quantity receiving device, who is looking at the state in which the receiving section (the attachment plug) in the physical-quantity receiving device is inserted into the supply section (the receptacle) in the physical-quantity supplying device, is unlikely to realize, from this state, whether billing has occurred or not. Thus, the user may feel uneasy or may be at a disadvantage. However, in the first embodiment, since the user is notified that the obligation to pay the value is effected, and asked whether to continue receiving the physical quantity, such a disadvantage is unlikely to result.

[Second Embodiment]

A second embodiment is a modification of the first embodiment. In the second embodiment, the physical quantity is configured using a packet structure including a header section and a payload. Information about the physical-quantity receiving device is included in the header section. The payload is equivalent to the physical quantity (the electric power). Specifically, for example, a code may be written in the header section, the code indicating that the electric power that is the physical quantity is supplied to the physical-quantity receiving device 10 configured using the personal computer, and that the physical quantity is not supplied to the other physical-quantity receiving devices 10. It is to be noted that the physical-quantity supplying device 120 includes a packet generation section (not illustrated), and the header section in the packet structure which has been sent from outside is allowed to include the information about the physical-quantity receiving device. Further, a packet disassembly section (not illustrated) is included in the physical-quantity receiving device 10.

The physical-quantity receiving device 10 then determines whether to allow receipt of the physical quantity, based on the information about the physical-quantity receiving device included in the header section in the received physical quantity. To be more specific, at the time when the receiving section (the attachment plug) 12 is inserted into the supply section (the outlet) 122, the personal computer forming the physical-quantity receiving device 10 is activated, and further, the physical-quantity receiving program is started up, whether to allow receipt of the physical quantity is determined based on the information about the physical-quantity receiving device included in the header section. In other words, when the physical-quantity receiving device 10 is configured using the personal computer, the physical-quantity receiving device 10 determines to receive the physical quantity, and prepares for acceptance of supply of the physical quantity from the physical-quantity supplying device 120. In this case, it is notified that the physical-quantity receiving device 10 has been connected to appropriate one of the physical-quantity supplying devices 120. On the other hand, when the physical-quantity receiving device 10 is a physical-quantity receiving device other than the personal computer, the physical-quantity receiving device 10 determines not to receive the physical quantity, and cancels receipt of the physical quantity from the physical-quantity supplying device 120. In this case, it is notified that the physical-quantity receiving device 10 has been connected to inappropriate one of the physical-quantity supplying devices 120.

Otherwise, the physical-quantity receiving device of the second embodiment is allowed to have a structure and a configuration similar to those of the physical-quantity receiving device of the first embodiment. The physical-quantity receiving method of the second embodiment may be similar to the physical-quantity receiving method of the first embodiment and thus, detailed description thereof will be omitted.

[Third Embodiment]

Figure 2:
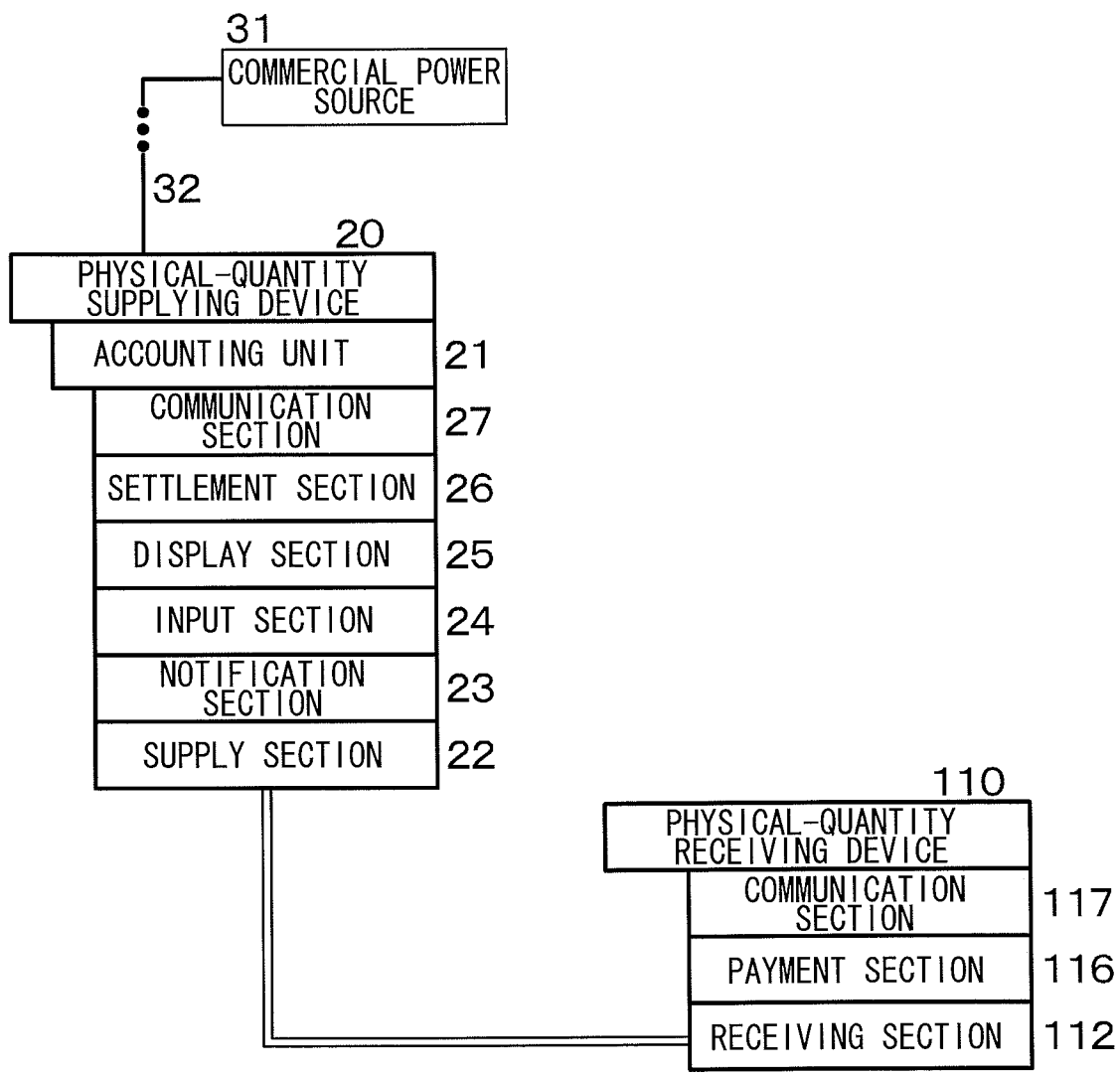
FIG. 2 is a conceptual diagram of a physical-quantity supplying device according to a third embodiment.

A third embodiment is about a physical-quantity supplying device and a physical-quantity supplying method according to an embodiment of the disclosure. As illustrated in a conceptual diagram of FIG. 2, the physical-quantity supplying device 20 of the third embodiment is a physical-quantity supplying device that includes an accounting unit 21, and supplies the physical-quantity receiving device 110 with a predetermined physical quantity (specifically, electric power) used to drive the physical-quantity receiving device 110. The accounting unit 21 includes, (a) the supply section 22 that supplies a physical quantity, (b) a notification section 23 that notifies, during supply of a physical quantity, a user that an obligation to pay a value is effected, and asks the user whether to continue supplying the physical quantity, and (c) a settlement section 26 that requests, after a lapse of a unit time, or after supply of a unit physical quantity, the physical-quantity receiving device 110 to perform payment of a value of the physical quantity per the unit time by electronic money or payment of a value for the unit physical quantity by electronic money.

In addition, the physical-quantity supplying device 20 of the third embodiment includes an input section 24 that inputs whether to accept supply of a physical quantity and whether to continue supplying the physical quantity. The physical-quantity supplying device 20 further includes a display section 25 that displays contents of notification of the notification section 23 and contents of input in the input section 24. The physical-quantity supplying device 20 further includes the communication section 27. The physical-quantity supplying device 20 of the third embodiment is a device exclusive to the physical-quantity receiving device 110 including the receiving section 112 to be engaged with the supply section 22.

In the physical-quantity supplying device 20 of the third embodiment or any of the fourth embodiment and the fifth embodiment described later, the notification section 23 and the settlement section 26 of the accounting unit 21 may be configured using, for example, a combination of a CPU and a storage section (memory, storage medium, or the like), i.e. using an integral circuit. The display section 25 of the accounting unit 21 is a liquid crystal display, and the input section 24 is a keyboard or a touch panel integral with the display section 25.

A physical-quantity supplying method of the third embodiment is a method of supplying a predetermined physical quantity. Further, a physical-quantity supplying program of the third embodiment is a program used to perform processing in the accounting unit 21, in the physical-quantity supplying device 20 that includes the accounting unit 21 and supplies the physical-quantity receiving device 110 with a predetermined physical quantity used to drive the physical-quantity receiving device 110. Further, in the physical-quantity supplying method or the physical-quantity supplying program of the third embodiment, a user is notified that, during supply of a physical quantity, an obligation to pay a value is effected, and asked whether to continue supplying the physical quantity, and after a lapse of a unit time, or after supply of a unit physical quantity, payment of a value of the physical quantity per the unit time by electronic money or payment of a value for the unit physical quantity by electronic money is requested.

Specifically, in a state in which the physical-quantity supplying program is started in the physical-quantity supplying device 20, the receiving section (the attachment plug) 112 in the physical-quantity receiving device 110 is inserted into the supply section (the receptacle) 22 in the physical-quantity supplying device 20, to activate the personal computer forming the physical-quantity receiving device 110. Whether to accept supply of the physical quantity is displayed on the display section 25 of the accounting unit 21 in the physical-quantity supplying device 20. When a user of the physical-quantity receiving device 110 orders to start supplying the physical quantity via the input section 24, the physical-quantity supplying device 20 starts supplying the physical quantity (the electric power) to the physical-quantity receiving device 110 via the supply section (the power supply section) 22 and the receiving section (the power receiving section) 112. Specifically, charging of a battery in the personal computer forming the physical-quantity receiving device 110 is started.

During supply of the physical quantity, the notification section 23 notifies the user that an obligation to pay a value is effected. Specifically, a sound effect of "a beep" may be produced, for example, per unit time, specifically, per minute, by a speaker built in the physical-quantity supplying device 20, for example. In addition, the fact that the obligation to pay the value is effected is displayed on the display section 25, and the amount of the value (an amount of money) is displayed. Further, during supply of the physical quantity, the notification section 23 keeps asking the user by using the display section 25, about whether to continue supplying the physical quantity.

Unless input ordering to stop supply of the physical quantity is provided from the input section 24, the supply of the physical quantity continues. Subsequently, after a lapse of a unit time (for example, after a lapse of one minute) or after supply of a unit physical quantity (e.g. 10 watts), the settlement section 26 requests the physical-quantity receiving device 110 to perform payment of a value of the physical quantity per the unit time by electronic money or payment of a value for the unit physical quantity by electronic money. Based on an existing method, the physical-quantity receiving device 110 performs payment by using the payment section 116 built therein, via the communication sections 117 and 27 as well as a communication line (not illustrated). Specifically, for the settlement section 26 provided in the physical-quantity supplying device 20, the physical-quantity receiving device 110 performs payment of the value by electronic money based on an existing method, by using the built-in payment section 116, via the communication sections 117 and 27 as well as the communication line (not illustrated). Alternatively, for a server (not illustrated) managing the physical-quantity supplying device 120, the physical-quantity receiving device 110 performs payment of the value by electronic money based on an existing method, by using the built-in payment section 116, via the communication section 117 and a communication line (not illustrated).

When input ordering to stop supply of the physical quantity is performed at the input section 24, the settlement section 26 stops the supply of the physical quantity, after a lapse of the unit time, or after supply of the unit physical quantity. The settlement section 26 then requests the physical-quantity receiving device 110 to perform payment of the value of the physical quantity per the unit time by electronic money or payment of the value for the unit physical quantity by electronic money. The physical-quantity receiving device 110 performs the payment of the value based on an existing method, by using the built-in payment section 116. Alternatively, also when the battery in the personal computer forming the physical-quantity receiving device 110 is fully charged, the settlement section 26 stops supply of the physical quantity, after a lapse of the unit time, or after supply of the unit physical quantity. The settlement section 26 then requests the physical-quantity receiving device 110 to perform payment of a value of the physical quantity per the unit time by electronic money or payment of a value for the unit physical quantity by electronic money. The physical-quantity receiving device 110 performs the payment of the value based on an existing method, by using the built-in payment section 116.

The physical-quantity supplying device of the third embodiment includes the settlement section that requests the physical-quantity receiving device to perform, after a lapse of the unit time, or after supply of the unit physical quantity, payment of the value of the physical quantity per the unit time or payment of the value for the unit physical quantity by electronic money. Further, the physical-quantity supplying device of the third embodiment includes the notification section that notifies the user that the obligation to pay the value is effected, and asks the user whether to continue supplying the physical quantity, during supply of the physical quantity. In addition, in the physical-quantity supplying method or the physical-quantity supplying program according to the third embodiment of the disclosure, when the supply of the physical quantity is to be continued, after a lapse of the unit time, or after supply of the unit physical quantity, payment of the value of the physical quantity per the unit time or payment of the value for the unit physical quantity by electronic money is requested. Here, during the supply of the physical quantity, the user is notified that the obligation to pay the value is effected and asked whether to continue supplying the physical quantity. Therefore, in a state of continuously supplying a predetermined physical quantity, the user or the like of the physical-quantity receiving device is allowed to reliably and precisely grasp occurrence of continuous billing. In other words, the user of the physical-quantity receiving device, who is looking at the state in which the receiving section (the attachment plug) in the physical-quantity receiving device is inserted into the supply section (the receptacle) in the physical-quantity supplying device, is unlikely to realize, from this state, whether billing has occurred or not. Thus, the user may feel uneasy or may be at a disadvantage. However, in the third embodiment, since the user is notified that the obligation to pay the value is effected, and asked whether to continue supplying the physical quantity, such a disadvantage is unlikely to result.

[Fourth Embodiment]

Figure 3:
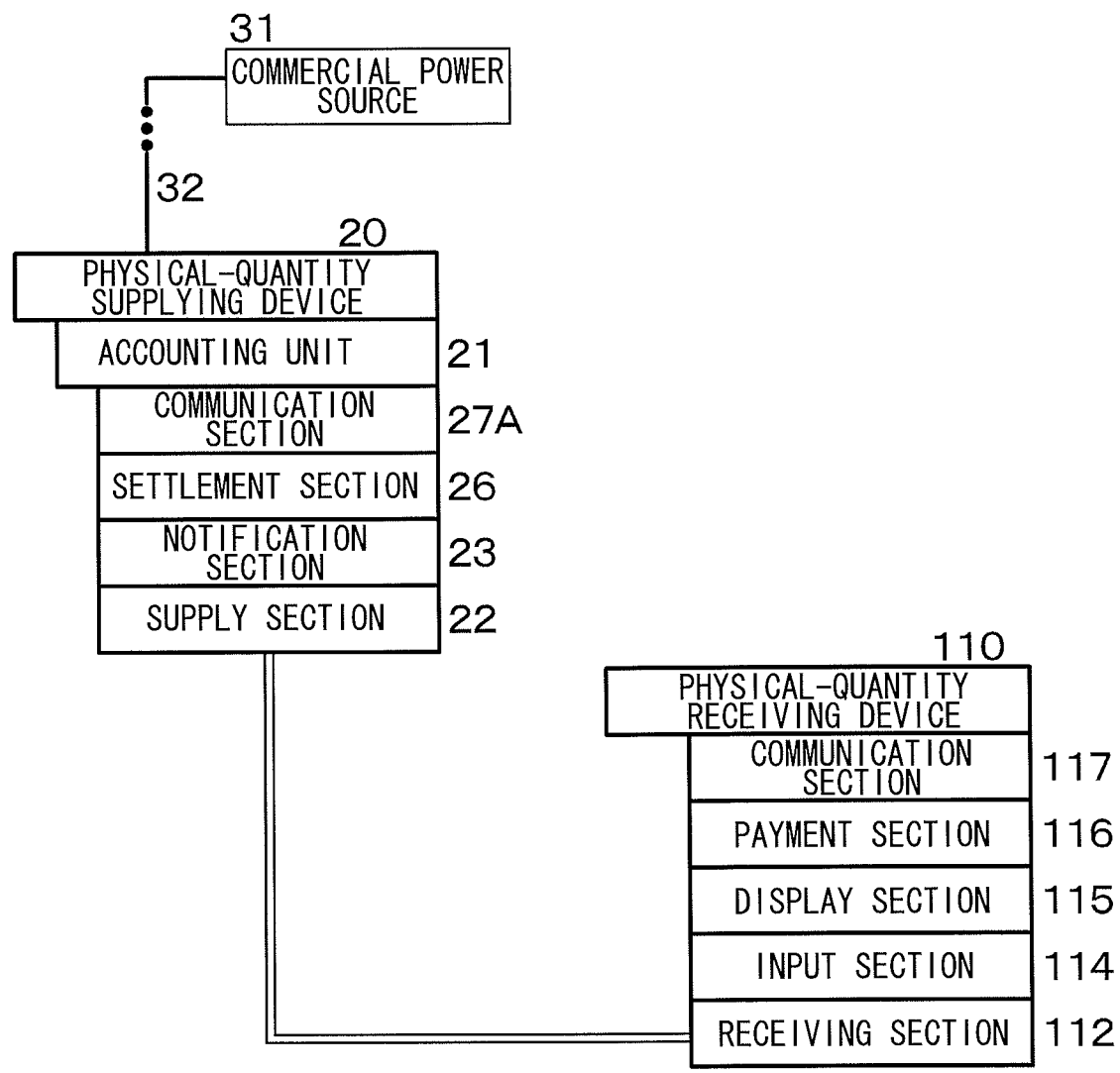
FIG. 3 is a conceptual diagram of a physical-quantity supplying device according to a fourth embodiment.

A fourth embodiment is a modification of the third embodiment. As illustrated in a conceptual diagram of FIG. 3, a communication section 27A configured using an existing communication device is included in the physical-quantity supplying device 20 of the fourth embodiment. Here, the communication section 27A sends contents of notification of the notification section 23 to the physical-quantity receiving device 110. In addition, the communication section 27A receives contents of input representing whether to accept supply of a physical quantity inputted at the physical-quantity receiving device 110, and whether to continue supplying the physical quantity. The communication section 27A and the physical-quantity receiving device 110 are allowed to communicate with each other, based on a Power Line Communication (PLC) technique, or through a communication circuit, for example. The physical-quantity receiving device 110 includes the input section 114 that inputs whether to accept supply of the physical quantity and whether to continue supplying the physical quantity. The physical-quantity receiving device 110 further includes the display section 115 that displays contents of notification of the notification section 13 and contents of input in the input section 114.

In the fourth embodiment, specifically, in a state in which the physical-quantity supplying program is started in the physical-quantity supplying device 20, the receiving section (the attachment plug) 112 is inserted into the supply section (the receptacle) 22, to activate the personal computer forming the physical-quantity receiving device 110. The contents of notification of the notification section 23 are sent to the physical-quantity receiving device 110, via the communication sections 27A and 117. At the display section 115 in the physical-quantity receiving device 110, whether to accept supply of the physical quantity is displayed. When the user of the physical-quantity receiving device 110 orders start supplying the physical quantity through the input section 114 of the physical-quantity receiving device 110, the contents of the input, which is provided in the physical-quantity receiving device 110 and represents whether to continue supplying the physical quantity as well as whether to accept the supply of physical quantity, are sent to the physical-quantity supplying device 20, via the communication sections 117 and 27A. The supply of the physical quantity (the electric power) from the physical-quantity supplying device 20 via the supply section 22 and the receiving section 112 is then initiated. Specifically, charging of the battery in the personal computer forming the physical-quantity receiving device 110 is started.

During the supply of the physical quantity, the notification section 23 notifies the user that an obligation to pay a value is effected. Specifically, a sound effect of "a beep" may be produced, for example, per unit time, specifically, per minute, by the speaker built in the physical-quantity receiving device 110, for example. In addition, the fact that the obligation to pay the value is effected is displayed on the display section 115, and the amount of the value (an amount of money) is displayed. Further, during the supply of the physical quantity, the notification section 23 keeps asking the user by using the display section 115, about whether to continue supplying the physical quantity. These are performed via the communication sections 27A and 117.

Unless input ordering to stop supply of the physical quantity is provided from the input section 114, the supply of the physical quantity continues. Subsequently, after a lapse of a unit time (for example, after a lapse of one minute) or after supply of a unit physical quantity (e.g. 10 watts), the settlement section 26 requests the physical-quantity receiving device 110 to perform payment of a value of the physical quantity per the unit time by electronic money or payment of a value for the unit physical quantity by electronic money. The physical-quantity receiving device 110 performs the payment of the value based on an existing method, by using the payment section 116 built in the physical-quantity receiving device 110.

When input ordering to stop supply of the physical quantity is performed at the input section 114, the settlement section 26 stops the supply of the physical quantity, after a lapse of the unit time, or after supply of the unit physical quantity. The settlement section 26 then requests the physical-quantity receiving device 110 to perform payment of the value of the physical quantity per the unit time by electronic money or payment of the value for the unit physical quantity by electronic money. The physical-quantity receiving device 110 performs the payment of the value based on an existing method, by using the built-in payment section 116. Alternatively, also when the battery in the personal computer forming the physical-quantity receiving device 110 is fully charged, the settlement section 26 stops supply of the physical quantity, after a lapse of the unit time, or after supply of the unit physical quantity. The settlement section 26 then requests the physical-quantity receiving device 110 to perform payment of a value of the physical quantity per the unit time by electronic money or payment of a value for the unit physical quantity by electronic money. The physical-quantity receiving device 110 performs the payment of the value based on an existing method, by using the built-in payment section 116.

Otherwise, the physical-quantity supplying device of the fourth embodiment is allowed to have a structure and a configuration similar to those of the physical-quantity supplying device of the third embodiment. The physical-quantity receiving method of the fourth embodiment may be similar to the physical-quantity receiving method of the third embodiment and thus, detailed description thereof will be omitted.

[Fifth Embodiment]

A fifth embodiment is a modification of any of the third embodiment and the fourth embodiment. In the fifth embodiment, in a manner similar to the second embodiment, the physical quantity is configured using a packet structure including a header section and a payload. Information about the physical-quantity receiving device is included in the header section. Specifically, for example, a code may be written in the header section, the code indicating that electric power that is the physical quantity is supplied to the physical-quantity receiving device 110 configured using the personal computer, and that the physical quantity is not supplied to the other physical-quantity receiving devices 110. It is to be noted that the physical-quantity supplying device 20 includes a packet generation section (not illustrated), and the header section in the packet structure which has been sent from outside is allowed to include the information about the physical-quantity receiving device. Further, a packet disassembly section (not illustrated) is included in the physical-quantity receiving device 110.

The physical-quantity supplying device 20 sends the header section including the information about the physical-quantity receiving device and the payload to the physical-quantity receiving device 110. The accounting unit 21 in the physical-quantity supplying device 20 then receives determination as to whether to allow the supply of the physical quantity to the physical-quantity receiving device 110 based on the information about the physical-quantity receiving device included in the header section, from the physical-quantity receiving device 110, as information. When it is determined that the supply of the physical quantity is allowed, the supply of the physical quantity is performed. Specifically, suppose, at the time when the physical-quantity receiving program is started up, and the receiving section (the attachment plug) 112 is inserted into the supply section (the outlet) 22 to activate the personal computer forming the physical-quantity receiving device 110, it is determined that the supply of the physical quantity based on the information about the physical-quantity receiving device included in the header section is allowed. In other words, suppose the physical-quantity receiving device 110 is configured using the personal computer. The physical-quantity receiving device 20 then prepares for the supply of the physical quantity to the physical-quantity receiving device 110. In this case, it is notified that the physical-quantity receiving device 110 has been connected to appropriate one of the physical-quantity supplying devices 20. On the other hand, suppose it is determined that the supply of the physical quantity based on the information about the physical-quantity receiving device included in the header section is not allowed. In other words, suppose the physical-quantity receiving device 110 is a physical-quantity receiving device other than the personal computer. The physical-quantity supplying device 20 then cancels the supply of the physical quantity to the physical-quantity receiving device 110. In this case, it is notified that the physical-quantity receiving device 110 has been connected to inappropriate one of the physical-quantity supplying devices 20.

Otherwise, the physical-quantity supplying device of the fifth embodiment is allowed to have a structure and a configuration similar to those of the physical-quantity supplying device of the third embodiment or the fourth embodiment. The physical-quantity receiving method of the fifth embodiment may be similar to the physical-quantity receiving method of the third embodiment or the fourth embodiment and thus, detailed description thereof will be omitted.

The disclosure has been described based on some preferred embodiments, but is not limited thereto. The structure and configuration of each of the physical-quantity receiving device and the physical-quantity supplying device in each of the embodiments may be modified as appropriate. In each of the embodiments described above, the physical-quantity receiving device is assumed to be the personal computer, but is not limited thereto.

As another modification of the physical-quantity supplying device, the following physical-quantity supplying device may be adopted. That is the physical-quantity supplying device in which, the physical quantity is electric power,
a power-line transmit-receive section and a communication filter are further provided,
the communication filter is disposed between the supply section and the power-line transmit-receive section, and blocks a signal (e.g. a signal of 50 Hz or 60 Hz) that at least has a frequency of the electric power, without blocking a first high frequency signal and a second high frequency signal (e.g. a signal of 13.56 MHz),
the power-line transmit-receive section sends the first high frequency signal having a frequency higher than the frequency of the electric power, via the communication filter and the supply section, and
the power-line transmit-receive section receives, via the supply section and the communication filter, the second high frequency signal generated as identification information (e.g. data indicating an identification number unique to the physical-quantity receiving device, and data indicating a type, a manufacturer, a model number of the physical-quantity receiving device) by load modulation, based on the electric power that is generated based on the first high frequency signal, in the physical-quantity receiving device. According to this modification of the physical-quantity supplying device, it is possible to recognize the physical-quantity receiving device, even when the electric power that is the physical quantity is not supplied to the physical-quantity receiving device. In other words, at the time when the receiving section (the attachment plug) 12 (112) is inserted into the supply section (the receptacle) 122 (22), the physical-quantity supplying device is allowed to obtain various kinds of information about the physical-quantity receiving device, even when the electric power is not supplied to the physical-quantity receiving device. Preferably, a second communication filter may be further provided to prevent entrance of a high frequency signal, toward the power receiving section of (i.e. a part upstream of) the physical-quantity supplying device.

Alternatively, as another modification of the physical-quantity receiving device, which is compatible with the above-described physical-quantity supplying device, the following physical-quantity receiving device may be adopted. That is the physical-quantity receiving device in which, the physical quantity is electric power,
a power-line transmit-receive section and a communication filter are further provided,
the communication filter is disposed between the receiving section and the power-line transmit-receive section, and blocks a signal (e.g. a signal of 50 Hz or 60 Hz) that at least has a frequency of the electric power, without blocking a first high frequency signal and a second high frequency signal (e.g. a signal of 13.56 MHz),
the power-line transmit-receive section receives the first high frequency signal having a frequency higher than the frequency of the electric power, via the communication filter and the supply section,
the power-line transmit-receive section generates the electric power based on the first high frequency signal, and generates the second high frequency signal as identification information (e.g. data indicating an identification number unique to the physical-quantity receiving device, and data indicating a type, a manufacturer, a model number of the physical-quantity receiving device) by load modulation, and
the power-line transmit-receive section sends the second high frequency signal to the physical-quantity supplying device, via the communication filter and the receiving section. According to this modification of the physical-quantity receiving device, it is possible to recognize the physical-quantity receiving device, even when the electric power that is the physical quantity is not supplied. In other words, at the time when the receiving section (the attachment plug) 12 (112) is inserted into the supply section (the receptacle) 122 (22), the physical-quantity supplying device is allowed to obtain various kinds of information about the physical-quantity receiving device, even when the electric power is not supplied to the physical-quantity receiving device. Preferably, a second communication filter may be further provided to prevent entrance of a high frequency signal, toward a part downstream of the physical-quantity receiving device.

Furthermore, the application encompasses any possible combination of some or all of the various embodiments described herein and incorporated herein.

It is possible to achieve at least the following configurations from the above-described example embodiments of the disclosure.

(1) A physical-quantity receiving device, including an accounting unit including:
a receiving section receiving a predetermined physical quantity from a physical-quantity supplying device, the physical quantity allowing the physical-quantity receiving device to be driven;
a notification section providing, during receipt of the physical quantity, a user with a notification that the user is under obligation to make payment for the received physical quantity, and providing the user with an inquiry about whether to continue receiving the physical quantity;
an input section receiving a user's input that indicates whether to receive the physical quantity, and whether to continue receiving the physical quantity;
a display section displaying the notification from the notification section and the user's input to the input section; and
a payment section making payment for the physical quantity per a unit time by electronic money after a lapse of the unit time, or making payment for a unit physical quantity by electronic money after receipt of the unit physical quantity.

(2) The physical-quantity receiving device according to (1), wherein the physical quantity is electric power.

(3) The physical-quantity receiving device according to (1) or (2), wherein the physical-quantity supplying device includes a supply section to be engaged with the receiving section, and is exclusive to the physical-quantity receiving device.

(4) The physical-quantity receiving device according to any one of (1) to (3), further including:
a power-line transmit-receive section; and
a communication filter disposed between the receiving section and the power-line transmit-receive section,
wherein
the physical quantity is electric power,
the communication filter blocks at least a signal having a frequency of the electric power, without blocking a first high frequency signal having a frequency higher than the frequency of the electric power and a second high frequency signal serving as identification information, and
the power-line transmit-receive section receives the first high frequency signal from the physical-quantity supplying device via the communication filter and the supply section, generates the electric power based on the first high frequency signal, generates the second high frequency signal through load modulation, and then sends the second high frequency signal to the physical-quantity supplying device via the communication filter and the receiving section.

(5) The physical-quantity receiving device according to (1) or (2), wherein
the physical quantity is configured of a packet structure including a header section and a payload, the header section including information about the physical-quantity receiving device, and
the physical-quantity receiving device determines, based on the information about the physical-quantity receiving device included in the header section, whether to allow receipt of the physical quantity.

(6) The physical-quantity receiving device according to any one of (1) to (5), wherein the physical-quantity receiving device is a device selected from a group consisting of a cellular phone, a smartphone, a car navigation device, a tablet terminal, a personal digital assistant, a mobile music player, a mobile video player, a mobile game console, a personal computer, and an electric car.

(7) A physical-quantity supplying device, including an accounting unit including:
a supply section supplying a predetermined physical quantity to a physical-quantity receiving device, the physical quantity allowing the physical-quantity receiving device to be driven;
a notification section providing, during supply of the physical quantity, a user with a notification that the user is under obligation to make payment for the received physical quantity, and providing the user with an inquiry about whether to continue supplying the physical quantity; and
a settlement section requesting the physical-quantity receiving device to make payment for the physical quantity per a unit time by electronic money after a lapse of the unit time, or requesting the physical-quantity receiving device to make payment for a unit physical quantity by electronic money after supply of the unit physical quantity.

(8) The physical-quantity supplying device according to (7), further including an input section receiving a user's input that indicates whether to accept supply of the physical quantity and whether to continue supplying the physical quantity.

(9) The physical-quantity supplying device according to (8), further including a display section displaying the notification from the notification section and the user's input to the input section.

(10) The physical-quantity supplying device according to (7), further including a communication section sending the notification from the notification section to the physical-quantity receiving device, and receiving a user's input in the physical-quantity receiving device that indicates whether to accept supply of the physical quantity and whether to continue supplying the physical quantity.

(11) The physical-quantity supplying device according to any one of (7) to (10), wherein the physical quantity is electric power.

(12) The physical-quantity supplying device according to any one of (7) to (11), wherein the physical-quantity supplying device is exclusive to the physical-quantity receiving device, the physical-quantity receiving device including a receiving section to be engaged with the supply section.

(13) The physical-quantity supplying device according to any one of (7) to (12), further including:
a power-line transmit-receive section; and
a communication filter disposed between the supply section and the power-line transmit-receive section,
wherein
the physical quantity is electric power,
the communication filter blocks at least a signal having a frequency of the electric power, without blocking a first high frequency signal having a frequency higher than the frequency of the electric power and a second high frequency signal serving as identification information, and the power-line transmit-receive section sends the first high frequency signal to the physical-quantity receiving device via the communication filter and the supply section, and receives, from the physical-quantity receiving device via the supply section and the communication filter, the second high frequency signal generated through load modulation, based on the electric power that is generated based on the first high frequency signal, in the physical-quantity receiving device.

(14) The physical-quantity supplying device according to any one of (7) to (13), wherein the physical quantity is configured of a packet structure including a header section and a payload, the header section including information about the physical-quantity receiving device, and the physical-quantity supplying device sends the payload and the header section including the information about the physical-quantity receiving device to the physical-quantity receiving device.

(15) The physical-quantity supplying device according to (14), wherein the physical-quantity supplying device receives, from the physical-quantity receiving device, determination as to whether to allow supply of the physical quantity to the physical-quantity receiving device, the determination being based on the information about the physical-quantity receiving device included in the header section, and supplies the physical quantity when supply of the physical quantity is allowed in the determination.

(16) The physical-quantity supplying device according to any one of (7) to (15), wherein the physical-quantity receiving device receiving the predetermined physical quantity is a device selected from a group consisting of a cellular phone, a smartphone, a car navigation device, a tablet terminal, a personal digital assistant, a mobile music player, a mobile video player, a mobile game console, a personal computer, and an electric car.

(17) A physical-quantity receiving method of receiving a predetermined physical quantity, the method including:

providing, during receipt of the physical quantity, a user with a notification that the user is under obligation to make payment for the received physical quantity, and providing the user with an inquiry about whether to continue receiving the physical quantity; and making payment for the physical quantity per a unit time by electronic money after a lapse of the unit time, or making payment for a unit physical quantity by electronic money after receipt of the unit physical quantity, when continuing receipt of the physical quantity.

(18) A physical-quantity supplying method of supplying a predetermined physical quantity, the method including:

providing, during supply of the physical quantity, a user with a notification that the user is under obligation to make payment for the received physical quantity, and providing the user with an inquiry about whether to continue supplying the physical quantity; and making a request for making payment for the physical quantity per a unit time by electronic money after a lapse of the unit time, or making a request for making payment for a unit physical quantity by electronic money after supply of the unit physical quantity, when continuing supply of the physical quantity.

(19) A non-transitory storage medium having a machine-readable physical-quantity receiving program embodied therein, the physical-quantity receiving program allowing, when executed by a physical-quantity receiving device, an accounting unit of the physical-quantity receiving device to implement a method, the physical-quantity receiving device receiving a predetermined physical quantity from a physical-quantity supplying device and being driven by the physical quantity, the method including:

providing, during receipt of the physical quantity, a user with a notification that the user is under obligation to make payment for the received physical quantity, and providing the user with an inquiry about whether to continue receiving the physical quantity; and making payment for the physical quantity per a unit time by electronic money after a lapse of the unit time, or making payment for a unit physical quantity by electronic money after receipt of the unit physical quantity, when continuing receipt of the physical quantity.

(20) A non-transitory storage medium having a machine-readable physical-quantity supplying program embodied therein, the physical-quantity supplying program allowing, when executed by a physical-quantity supplying device, an accounting unit of the physical-quantity supplying device to implement a method, the physical-quantity supplying device supplying a predetermined physical quantity to a physical-quantity receiving device to allow the physical-quantity receiving device to be driven, the method including:

providing, during supply of the physical quantity, a user with a notification that the user is under obligation to make payment for the received physical quantity, and providing the user with an inquiry about whether to continue supplying the physical quantity; and making a request for making payment for the physical quantity per a unit time by electronic money after a lapse of the unit time, or making a request for making payment for a unit physical quantity by electronic money after supply of the unit physical quantity, when continuing supply of the physical quantity.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A physical-quantity receiving device, comprising an accounting unit including:
   a receiving section receiving a predetermined physical quantity from a physical-quantity supplying device, the physical quantity allowing the physical-quantity receiving device to be driven;
   a notification section providing, during receipt of the physical quantity, a user with a notification that the user is under obligation to make payment for the received physical quantity, and providing the user with an inquiry about whether to continue receiving the physical quantity;
   an input section receiving a user's input that indicates whether to receive the physical quantity, and whether to continue receiving the physical quantity;
   a display section displaying the notification from the notification section and the user's input to the input section; and
   a payment section making payment for the physical quantity per a unit time by electronic money after a lapse of the unit time, or making payment for a unit physical quantity by electronic money after receipt of the unit physical quantity, wherein the physical quantity is electric power.

2. The physical-quantity receiving device according to claim 1, wherein the physical-quantity supplying device includes a supply section to be engaged with the receiving section, and is exclusive to the physical-quantity receiving device.

3. The physical-quantity receiving device according to claim 1, further comprising:

a power-line transmit-receive section; and a communication filter disposed between the receiving section and the power-line transmit-receive section, wherein:

the communication filter blocks at least a signal having a frequency of the electric power, without blocking a first high frequency signal having a frequency higher than the frequency of the electric power and a second high frequency signal serving as identification information, and the power-line transmit-receive section receives the first high frequency signal from the physical-quantity supplying device via the communication filter and the supply section, generates the electric power based on the first high frequency signal, generates the second high frequency signal through load modulation, and then sends the second high frequency signal to the physical-quantity supplying device via the communication filter and the receiving section.

4. The physical-quantity receiving device according to claim 1, wherein the physical quantity is configured of a packet structure including a header section and a payload, the header section including information about the physical-quantity receiving device, and the physical-quantity receiving device determines, based on the information about the physical-quantity receiving device included in the header section, whether to allow receipt of the physical quantity.

5. The physical-quantity receiving device according to claim 1, wherein the physical-quantity receiving device is a device selected from a group consisting of a cellular phone, a smartphone, a car navigation device, a tablet terminal, a personal digital assistant, a mobile music player, a mobile video player, a mobile game console, a personal computer, and an electric car.

6. A physical-quantity supplying device, comprising an accounting unit including:

a supply section supplying a predetermined physical quantity to a physical-quantity receiving device, the physical quantity allowing the physical-quantity receiving device to be driven;

a notification section providing, during supply of the physical quantity, a user with a notification that the user is under obligation to make payment for the received physical quantity, and providing the user with an inquiry about whether to continue supplying the physical quantity; and a settlement section requesting the physical-quantity receiving device to make payment for the physical quantity per a unit time by electronic money after a lapse of the unit time, or requesting the physical-quantity receiving device to make payment for a unit physical quantity by electronic money after supply of the unit physical quantity, wherein the physical quantity is electric power.

7. The physical-quantity supplying device according to claim 6, further comprising an input section receiving a user's input that indicates whether to accept supply of the physical quantity and whether to continue supplying the physical quantity.

8. The physical-quantity supplying device according to claim 7, further comprising a display section displaying the notification from the notification section and the user's input to the input section.

9. The physical-quantity supplying device according to claim 6, further comprising a communication section sending the notification from the notification section to the physical-quantity receiving device, and receiving a user's input in the physical-quantity receiving device that indicates whether to accept supply of the physical quantity and whether to continue supplying the physical quantity.

10. The physical-quantity supplying device according to claim 6, wherein the physical-quantity supplying device is exclusive to the physical-quantity receiving device, the physical-quantity receiving device including a receiving section to be engaged with the supply section.

11. The physical-quantity supplying device according to claim 6, further comprising:

a power-line transmit-receive section; and a communication filter disposed between the supply section and the power-line transmit-receive section, wherein:

the communication filter blocks at least a signal having a frequency of the electric power, without blocking a first high frequency signal having a frequency higher than the frequency of the electric power and a second high frequency signal serving as identification information, and the power-line transmit-receive section sends the first high frequency signal to the physical-quantity receiving device via the communication filter and the supply section, and receives, from the physical-quantity receiving device via the supply section and the communication filter, the second high frequency signal generated through load modulation, based on the electric power that is generated based on the first high frequency signal, in the physical-quantity receiving device.

12. The physical-quantity supplying device according to claim 6, wherein the physical quantity is configured of a packet structure including a header section and a payload, the header section including information about the physical-quantity receiving device, and the physical-quantity supplying device sends the payload and the header section including the information about the physical-quantity receiving device to the physical-quantity receiving device.

13. The physical-quantity supplying device according to claim 12, wherein the physical-quantity supplying device receives, from the physical-quantity receiving device, determination as to whether to allow supply of the physical quantity to the physical-quantity receiving device, the determination being based on the information about the physical-quantity receiving device included in the header section, and supplies the physical quantity when supply of the physical quantity is allowed in the determination.

14. The physical-quantity supplying device according to claim 6, wherein the physical-quantity receiving device receiving the predetermined physical quantity is a device selected from a group consisting of a cellular phone, a smartphone, a car navigation device, a tablet terminal, a personal digital assistant, a mobile music player, a mobile video player, a mobile game console, a personal computer, and an electric car.

* * * * *